Figure 1:
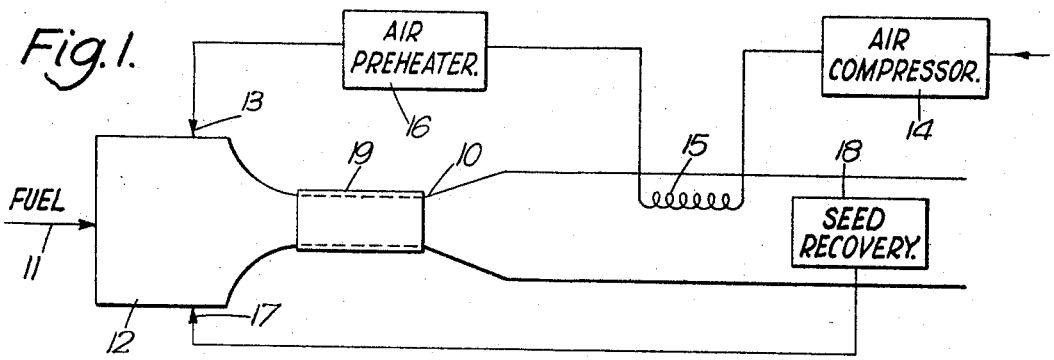

March 19, 1968    D. T. SWIFT-HOOK    3,374,370

MAGNETOHYDRODYNAMIC ELECTRICAL GENERATORS

Filed March 22, 1965

United States Patent Office 3,374,370
Patented Mar. 19, 1968

3,374,370
MAGNETOHYDRODYNAMIC ELECTRICAL
GENERATORS
Donald Thomas Swift-Hook, Dibden Purlieu, England, assignor to Central Electricity Generating Board, London, England, a British body corporate
Filed Mar. 22, 1965, Ser. No. 441,510
Claims priority, application Great Britain, Mar. 20, 1964, 11,873/64
7 Claims. (Cl. 310—11)

This invention relates to magnetohydrodynamic electrical generators in which a conductive fluid flows through a duct across which is applied a magnetic field.

With the necessary large magnetic fields, the efficiency of a generator having electrodes on opposite sides of the duct spaced in a direction which is orthogonal to the direction of motion of the fluid and to the magnetic field is reduced because of the Hall effect. The electrical conductivity is a tensor quantity and the electric fields and currents are no longer in the same direction. The electric field has components extending both across the duct at right angles to the magnetic field and along the duct. In order to avoid short circuiting the component of the electric field along the duct, segmented electrodes may be employed, that is to say the electrodes each extend only for a short length in the axial direction. In practice a large number of electrodes will be necessary. It is not generally convenient however to provide the generator with a corresponding number of separate independent loads and the present invention is directed to the construction of a magnetohydrodynamic electrical generator which can be connected to a single load.

In the I.E.E. Conference Report Series No. 4 (1962), "Magnetoplasmadynamic Electrical Power Generation," on page 66, De Montardy has described a particular arrangement of segmented electrode generator in which the power is extracted in a single load. For this purpose he requires that the electrodes be made of such length that, considering any one electrode on one side of the duct, the equipotential lines from the electrode on the opposite side of the duct extend to an electrode adjacent said one electrode on the first side of the duct and that electrical connections should be provided between electrodes on the opposite sides of the duct which are at the same potential. As is shown in the above-mentioned paper, however, such an arrangement can be employed only if the equipotential slopes are greater than or equal to four, that is to say if the distance between opposite electrodes is equal to or greater than four times the spacing between the centres of adjacent electrode. If this form of connection is used for smaller slopes, long segments must be used which short circuit sections of the axial electric field and very substantially reduce the performance of the generator. Alternatively, shorter segments can be employed which in certain circumstances can be used to feed a number of equal loads.

According to this invention, in a magnetohydrodynamic electrical generator, a duct through which conductive gas flows has, on two opposite surfaces, similar series of axially spaced electrodes and electrical connections are provided between those electrodes of the two series which lie in the desired equipotential planes at an angle to the axis of the duct whereby there are some unconnected electrodes at one end of one series and at the other end of the other series, and means are provided for connecting one end of a main load through a network of subsidiary loads to the unconnected electrodes at one end of one series and for connecting the other end of the main load through a second network of subsidiary loads to the unconnected electrodes at the other end of the other series, the subsidiary loads in each network being proportioned in accordance with the current flows to the various electrodes to which the network is connected to allow current to be drawn from or fed into these electrodes at the potentials appropriate to the required potential distribution along the duct. With this construction there is a single main load with a few subsidiary loads which will generally be of very much smaller magnitude than the main load. The electrodes may be made as short as may be desired in order to obtain the required efficiency. There is no limitation on the equipotential slope and this need not be constant along the length of the duct.

Each of said networks may comprise a number of subsidiary loads arranged in series, the number of loads in the network being equal to the number of unconnected electrodes, and the end one of these electrodes being connected to the end of the chain of series-connected subsidiary loads and the remaining electrode or electrodes being connected to the unction or the respective junctions between said loads. Thus, each subsidiary load is connected between two electrodes and has to have the appropriate potential drop across it equal to the required potential difference between those two electrodes.

It is not essential that there should be the same number of unconnected electrodes at each end of the duct but conveniently the two series of electrodes have equal numbers of electrodes. The corresponding electrodes of the two series may be arranged opposite to one another. If the slope of the equipotentials is constant along the duct, the electrodes in the two series may be similar and evenly spaced.

Very conveniently, the electrodes and the interconnections along the equipotential lines are formed by constructing the duct of tubes arranged in a closed loop as described in the specification of the copending application Ser. No. 440,821 filed Mar. 18, 1965. The arrangement of the present invention however finds particular application where it is preferred to have the two ends of the effective part of the power generating duct in planes at right angles to the axis of the duct. If the duct is constructed of tubular closed loop segments as described in the aforementioned specification, the unconnected electrodes at the end of the duct may be formed of U-shaped tubular elements, the planes of the U's lying in the desired equipotential planes.

Figure 2:
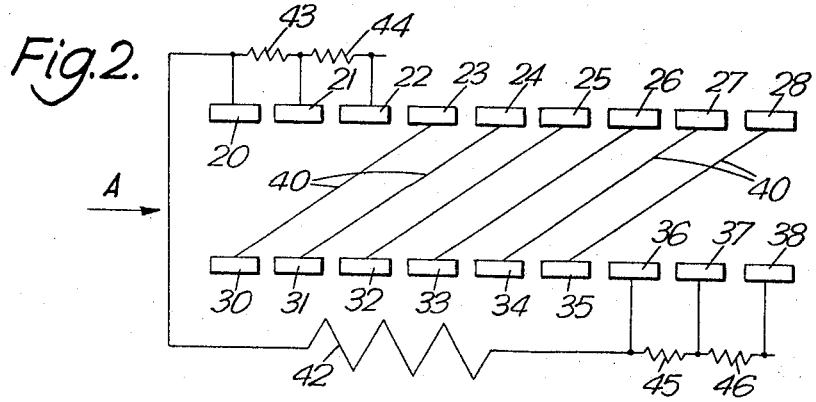

The following is a description of one embodiment of the invention, reference being made to the accompanying drawings in which:

FIGURE 1 is a diagrammatic representation of a magnetohydrodynamic electrical generator; and FIGURE 2 is a diagram showing the electrical connections from the generator of FIGURE 1.

Referring to FIGURE 1, there is shown diagrammatically a magnetohydrodynamic power generating apparatus of the open cycle type in which hot conductive gas obtained by burning a fuel are passed through a generating duct 10. The fuel is injected at 11 into a combustion chamber 12 where it is burnt using combustion air or oxygen or an oxygen air mixture injected at 13. In the particular arrangement illustrated, air from a compressor 14 is fed through a pre-heater 15 where this combustion air is heated using heat energy from the gases in the outlet from the generating duct 10. The compressed air may then be passed through a further pre-heating stage 16 into the combustion chamber 12. Typically the combustion air might be heated to a temperature 1200° C. and the outlet gases from the combustion chamber 12 passing out to the duct 10 might be at a temperature of the order of 2500° C.–3000° C. A seed material, such as a chemical compound containing potassium or caesium, is injected at 17 to increase the electrical conductivity of the outlet gases from the combustion chamber and most of this seed material is subsequently recovered for recirculation by seed recovery means indicated diagrammatically at 18.

From the combustion chamber 12 the hot conductive gases pass through the magnetohydrodynamic duct 10 across which extends a magnetic field. In FIGURE 1, the magnetic field is produced by an electro-magnet indicated diagrammatically by the rectangular shaped winding 19. The field, which extends in a direction normal to the plane of the paper, may in practice be produced by a superconductive winding to reduce the power requirements for the electromagnet. The effective power generating portion of the duct is that region where the gases flow through the magnetic field.

After heating the combustion air in the pre-heater 15, the gases for the generating duct may still be at a very high tempertaure and the heat in these gases may be utilised steam raising to provide steam for a steam turbine driving an alternator, some of the heat for steam raising may be obtained from the gases before they pass to the air pre-heater 15.

The duct 10 may conveniently be formed of a number of closed loop segments of tubular form as is described and claimed in the specification of co-pending patent application Ser. No. 440,821 filed Mar. 18, 1965.

Whether formed in this way or using some other construction, however, the duct is provided with series of electrodes on or constituting the top and bottom walls of the power generating region of the duct.

FIGURE 2 illustrates diagrammatically the duct with a first series of electrodes 20 to 28 on the top of the duct and a corresponding series of electrodes 30 to 38 on the bottom of the duct. The conductive gases flow through the duct in the direction of the arrow A and the magnetic field is applied across the duct in a direction normal to the surface of the paper. Under optimum conditions, current flows between electrodes on opposite sides of the duct, for example from electrode 20 to electrode 30. Due to the Hall effect, the electric fields and currents are not in the same direction and the electric field has components both across and along the duct so that the equipotential planes are not normal to the axis of the duct. Electrodes lying in equipotential planes are connected together by connections 40, for example electrode 30 to electrode 23, electrode 31 to electrode 24 etc. These connections may be electrical connections externally of the duct but very conveniently they are constituted by metal tubes forming part of the duct wall in the manner described and claimed in the aforementioned co-pending application Ser. No. 440,821 filed Mar. 18, 1965. Although only nine electrodes are shown in each series in FIGURE 2, in practice there would be a much higher number. The electrodes need not be evenly spaced and thus is possible to use this form of connection with a duct in which the preferred equipotential planes gradually change their slope along the length of the duct.

There is a single main load 42 which at one end is connected to the three electrodes 20, 21 and 22 and at the other end to the electrodes 36, 37 and 38. The electrodes 20, 21 and 22 have, for optimum efficiency, to be maintained at different potentials and for this purpose the connection from the main load 42 to these three electrodes is effected through a network of subsidiary loads comprising, in this case, two subsidiary loads 43 and 44. The load 43 is connected between electrodes 20 and 21 and the load 44 between electrodes 21 and 22 whilst load 42 is connected directly to electrode 20. It will be seen that the subsidiary loads 43 and 44 form in effect a potential divider circuit so that current may be fed to or taken from the electrodes 20, 21 and 22 as the case may be, with these electrodes at the required potentials for optimum efficiency of the generator system. Similarly, the other end of the duct, the electrodes 36, 37 and 38 have to be at different potentials for optimum efficiency. The load 42 is connected directly to the electrode 36. A subsidiary load 45 is connected between the electrode 36 and electrode 37 and a further subsidiary load 46 is connected between the electrode 37 and the electrode 38. These loads 45 and 46 form, again in effect, a potentiometer network to permit the electrodes to be at the required potentials for optimum efficiency.

It will be immediately apparent that various other circuit arrangements of subsidiary loads might be employed to give the required voltage differences between the various electrodes 20, 21, 22 and 36, 37, 38 whilst still feeding the currents from all these electrodes through a single main load.

The number of auxiliary loads will, in practice, be quite small, being dependent on the number of unconnected electrodes at each end of the duct which in turn depends on the equipotential slopes and the ratio between the electrode length and the electrode spacing across the duct. If there are a large number of electrodes along the duct, the magnitudes of these subsidiary loads will be very much smaller than that of the main load.

This arrangement may be particularly convenient for large power generating stations where the power in the main load could be used directly or inverted whilst the power in the smaller loads could be used for subsidiary power supplies or excitation without inversion.

It will be appreciated that the generator system of the present invention will operate even if the load conditions are not at the optimum, the current flow in the duct or in part of the duct in this case not being entirely transverse to the axis but having an axial component.

I claim:
1. In a magnetohydrodynamic electrical generator, a duct through which conductive gas flows, two similar series of axially spaced electrodes on opposite surfaces of the duct, electrical connections between those electrodes of the two series which lie in the desired equipotential planes at an angle to the axis of the duct whereby there are some unconnected electrodes at one end of one series and at the other end of the other series a main load, first and second networks of subsidiary loads, means connecting one end of said main load through said first network of subsidiary loads to the unconnected electrodes at one end of one series, and means connecting the other end of said main load through said second network of subsidiary loads to the unconnected electrodes at the other end of the other series, the subsidiary loads in each network being proportioned in accordance with current flows to the various electrodes to which the network is connected to allow current to be drawn from or fed into these electrodes at the potentials appropriate to the required potential disribution along the duct.

2. A magnetohydrodynamic electrical generator as claimed in claim 1 wherein each of said networks comprises a number of subsidiary loads arranged in series, the number of loads in the network being equal to the number of unconnected electrodes, and the end one of these electrodes being connected to the end of the chain of series-connected subsidiarly loads and the remaining electrode or electrodes being connected to the junction or the respective junctions between said loads.

3. A magnetohydrodynamic electrical generator as claimed in claim 2 wherein the two series of electrodes have equal numbers of electrodes.

4. A magnetohydrodynamic electrical generator as claimed in claim 3 wherein corresponding electrodes of the two series are opposite one another.

5. A magnetohydrodynamic electrical generator as claimed in claim 4 wherein the electrodes in each series are similar and evenly spaced.

6. A magnetohydrodynamic electrical power generator, comprising, in combination, a duct through which a conductive fluid flows, means for applying a magnetic field across said duct, two series of electrodes each series extending along the duct with the two series facing one another across the duct in a direction transverse to said magnetic field, electrical connections between each electrode of one series and the electrode of the other series which is at the same potential, whereby there are some unconnected electrodes at one end of one series and at the other end of the other series, a main load, first and second networks of subsidiary loads, means connecting one end of said main load through said first network of subsidiary loads to the unconnected electrodes at one end of one series, and means connecting the other end of said main load through said second network of subsidiary loads to the unconnected electrodes at the other end of the other series, the subsidiary loads in each network being proportioned in accordance with current flows to the various electrodes to which the network is connected to allow current ot be drawn from or fed into these electrodes at the potentials appropriate to the required potential distribution along the duct.

7. A magnetohydrodynamic electrical power generator as claimed in claim 6 wherein the two series of electrodes comprise equal number of electrodes and wherein each of said networks comprises a number of subsidiary loads arranged in series, the number of loads in each network being equal to the number of unconnected electrodes at one end of each of the two series, the outer end one of the unconnected electrodes in each series being connected to one end of the respective chain of series connected subsidiary loads and the remaining uncennected electrodes being connected to the junctions between said subsidiary loads and the main load being connected between the other ends of said chains.

References Cited
UNITED STATES PATENTS 3,294,990   12/1966   Dzung _____ 310—11

DAVID X. SLINEY, *Primary Examiner.*